United States Patent [19]
Goulet

[11] 3,981,193

[45] Sept. 21, 1976

[54] FLUID PRESSURE SENSING APPARATUS

[76] Inventor: Roger T. Goulet, 7952 Orion Path, Liverpool, N.Y. 13088

[22] Filed: May 23, 1975

[21] Appl. No.: 580,153

[52] U.S. Cl. .................................................. 73/212
[51] Int. Cl.² ........................................... G01F 1/46
[58] Field of Search .............. 73/182, 183, 212, 420

[56] References Cited
UNITED STATES PATENTS

| | | | |
|---|---|---|---|
| 1,250,238 | 12/1917 | Spitzglass | 73/212 |
| 1,645,449 | 10/1927 | Poebstel | 73/212 |
| 3,581,565 | 6/1971 | Dieterich | 73/212 |
| 3,685,355 | 8/1972 | DeBaum | 73/212 |

FOREIGN PATENTS OR APPLICATIONS

| | | | |
|---|---|---|---|
| 405,986 | 11/1922 | Germany | 73/212 |
| 724,276 | 2/1955 | United Kingdom | 73/212 |

Primary Examiner—Herbert Goldstein

[57] ABSTRACT

Apparatus for permanent installation in a heating or air conditioning duct to sense total and static pressure of air flowing therethrough. A plurality of manifolds are arranged within the duct to sense total pressure at a number of selected locations in a transverse plane of the duct. The plurality of manifolds communicates with a connecting manifold either directly or through sensing tubes arranged axially within the manifold tubes. Static pressure is also sensed at a plurality of preselected locations in the duct and communicated to at least one additional manifold tube arranged within the duct. Total and static pressure are communicated through single openings in the duct well for attachment exteriorly thereof to an appropriate measuring instrument.

7 Claims, 9 Drawing Figures

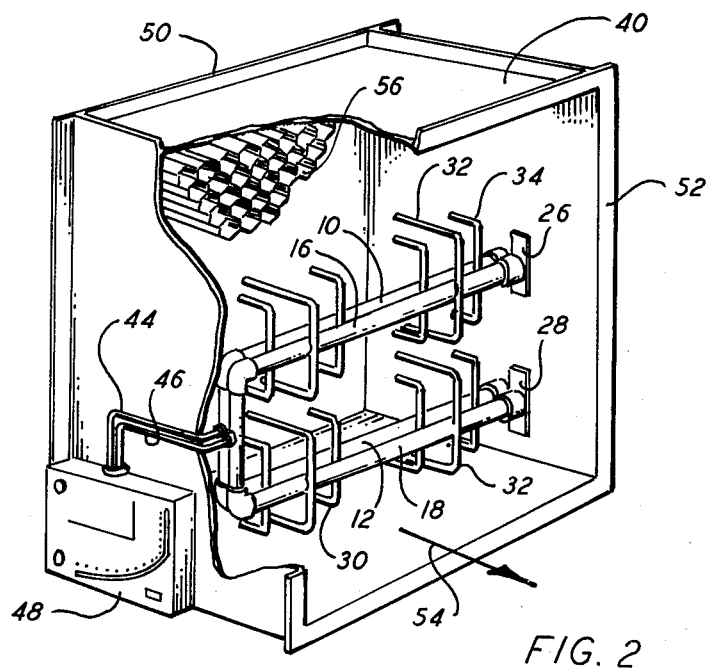
FIG. 2
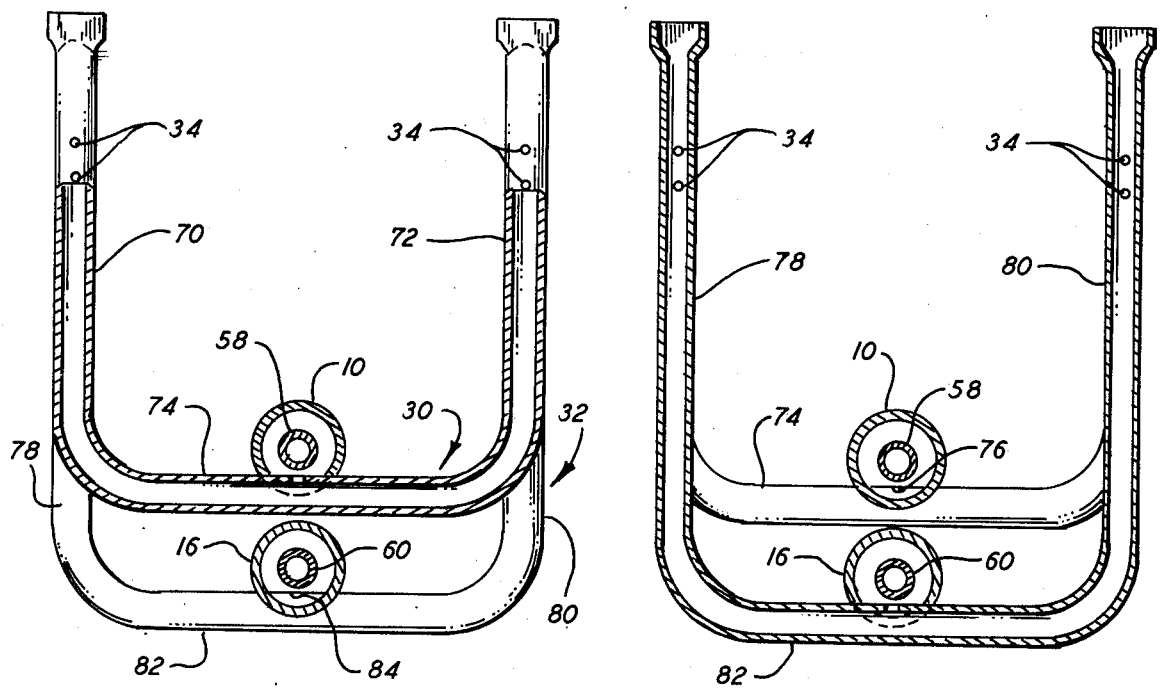
FIG. 4
FIG. 5

FLUID PRESSURE SENSING APPARATUS

BACKGROUND OF THE INVENTION

The present invention relates to pressure sensing apparatus and, more particularly, to novel apparatus for sensing an average across a transverse plane of an enclosed duct or both total and static pressure of a gas flowing therethrough.

In heating and ventilating systems wherein air flows through enclosed ducts to outlet openings, it is desirable to be able to measure the velocity of air at various points in the system so that proper quantities are delivered through the various outlets. One method of measuring the velocity of air flow is to sense the total pressure using a device such as an impact tube and to sense static pressure through other probes or openings in the duct wall. The differences between the total and static pressures is the velocity pressure. Velocity is calculated by multiplying the square root of the velocity pressure by a constant. An alternate means is a pitot tube, which measures both the total pressure and the static pressure and is connected to a guage in such a way that the static pressure opposes the total pressure. The result is a guage reading corresponding to the velocity pressure. Pressure sensing instruments from which readings of velocity or volume of flow per unit of time may be directly taken are also available.

One problem associated with accurate pressure measurement is that the velocity, and therefore the total and static pressure readings from which velocity pressure is derived, may not be uniform across any given cross-sectional plane of the duct. In order to obtain a representative indication of the average velocity at any particular transverse plane of the duct, it is necessary to take pressure readings at a number of points and average the corresponding velocities.

Some measurement systems are made with a single pressure sensor which is moved to several locations in the area of air flow, and the results are averaged. In other systems, a plurality of sensors are permanently installed at spaced locations in the same transverse plane of the duct, and the results averaged. In some systems of this type, the sensors are connected to a common plenum or manifold, the pressure within which reflects a composite of the several sensors. In these so-called self averaging systems, however, certain design constraints must be observed in order to minimize errors in the readings.

In U.S. Pat. No. 3,685,355 a plurality of total pressure sensors in the form of impact tubes are connected to a common manifold to which a tube leading through the duct wall to the measuring instrument is connected at a point symmetrically arranged with respect to the sensors. The tube leads from one side of the measuring instrument, externally of the duct, through the wall and interior of the duct and is connected to the midpoint of the manifold to which an equal number of symmetrically arranged sensors are connected on each side of the tube connection.

The apparatus of U.S. Pat. No. 3,581,565 provides another example of the self averaging principles of fluid pressure measurement, applied in the same manner as in the previously mentioned patent. Rather than a tube physically extending through the duct wall from the measuring instrument to the midpoint of the manifold, however, the pressure is communicated to the measuring instrument by a hollow sensing tube within the manifold. The sensing tube has an opening at the center of the manifold tube, through which the manifold pressure is communicated to the inside of the sensing tube, which extends through the wall of the duct for connection to the instrument.

In the aforementioned U.S. Pat. No. 3,685,355 the total pressure may be communicated from the duct to either a single manifold extending transversely across the duct, or a plurality of manifolds connected at their centers by a cross manifold to form a common chamber. In either case, a tube from the measuring instrument enters the duct through a wall thereof and extends to a connection with the manifold, or cross manifold, at the geometric center thereof. Static pressure is sensed by a plurality of probes, each extending through the duct wall to a common manifold, exterior of the duct, from which the pressure is communicated from some convenient point to the measuring instrument.

In U.S. Pat. No. 3,581,565, total pressure is always communicated from the duct to a single manifold having therein a sensing tube extending through the duct wall for connection to the measuring instrument. Static pressure is sensed by a single probe extending, from interior mid-point of the duct through the wall thereof for connection to the measuring instrument.

A non-uniform velocity profile across the transverse plane in which the pressures are sensed means that the pressure will be higher at some sensor locations than at others. Thus, air may flow into the probes located at the high pressure points, through the manifold, and out of the probes at the low pressure points. If air flow through the manifold is appreciable, the conditions in an enclosed vessel to which Pascal's law applies will not prevail. That is, change in pressure at some point within the manifold will not be transmitted undiminished throughout the manifold. The pressure within the manifold will vary from a high near the probes sensing high velocities to a low near the probes sensing low velocities. The point at which an equalized pressure would be obtained is indeterminate. Since the velocity profile is variable in typical heating and air conditioning systems, it is not possible to establish a fixed point within an inadequately proportioned manifold, which corresponds to the equalized pressure in any system wherein the sensing apparatus may be employed. Further, without proper proportioning of manifold and probe components, a pressure corresponding to the true average velocity in the duct may not be developed anywhere within the manifold.

Both of the aforementioned patents use the geometric center of the manifold as the point from which manifold pressure is communicated to the measuring instrument, with sensing locations arranged symmetrically on each side of the center point. While the geometric center may represent the best compromise, it is preferable to provide apparatus wherein the static conditions to which Pascal's law applies are more closely approximated within the manifold, thereby making less critical the location of the point within the manifold from which pressure is communicated to the measuring instrument.

SUMMARY OF THE INVENTION

In its most basic form, the object of the present invention is to provide apparatus for sensing both total and static pressure of a fluid flowing within an enclosed duct which employs a plurality of communicating total pressure manifolds and at least one static pressure manifolds, all extending transversely across the duct, each of the total and static pressures being communicated through a single opening in the duct wall for connection externally thereof to a measuring instrument.

A further object is to provide pressure sensing means having a plurality of manifolds to which the pressure in an enclosed duct is communicated, and having an improved arrangement for treating the pressures within the several manifolds and communicating it to a measuring instrument.

Still another object is to provide fluid pressure sensing apparatus wherein both total and static pressure are sensed at a plurality of locations across transverse planes of an enclosed duct, and including novel and improved means for communicating a true representative value of each pressure to a measuring instrument outside the duct.

Other objects will in part be obvious and will in part appear hereinafter.

In accordance with the foregoing objects, the invention comprises apparatus for permanent installation in a duct such as those employed in heating and air conditioning systems. In a first disclosed embodiment, two pairs of manifold tubes extend transversely across the duct, parallel to one another. All of the tubes are closed at one end and the tubes of each pair are connected at the opposite ends by first and second connecting manifolds. A plurality of total pressure sensing probes are attached to and extend in the upstream direction from the first pair of manifold tubes to communicate the pressure at each probe tip to the interior of the manifolds. Attached to the second pair of manifold tubes are a plurality of static pressure sensing probes for communicating the duct static pressure to the interior of the second pair of manifolds.

A hollow sensing tube is axially arranged within each manifold tube of both pairs. The sensing tubes extend through end caps which seal the manifold tubes from direct communication with the connecting manifolds. An opening is provided through the wall of each sensing tube at some intermediate point thereon within the manifold, and the end of the sensing tube within the connecting manifold is open, thus communicating the pressure from the first pair of manifold tubes to the first connecting manifold and from the second pair of manifold tubes to the second connecting manifold. Each connecting manifold is arranged closely adjacent the duct wall, and is provided with a fitting at its center through which the pressures within the respective cross manifolds are communicated to the exterior of the duct. The fittings are connected, on the outside of the duct, to opposite sides of a measuring instrument.

In a second embodiment, the sensing apparatus is arranged within a circular duct section. A first pair of manifold tubes extend diametrically across the duct, perpendicular to one another, crossing and communicating at their centers. A second pair of manifold tubes is similarly arranged in a plane spaced longitudinally within the duct from the first pair and rotated 45° with respect thereto. A connecting manifold extends axially of the duct to connect the first and second pairs of manifolds at their centers, forming a common chamber. Rather than pressure sensing probes such as the impact tubes of the first embodiment, openings are provided directly in the side of each manifold tube upon which the fluid stream is directed, thereby communicating the total pressure at selected points within the duct to the common chamber formed by the two pairs of manifold tubes and the connecting manifold.

A third pair of manifold tubes extends diametrically across the duct, crossing and communicating at the center. A plurality of U-shaped sensing probes extends from each of these manifolds for communicating thereto the static pressure at selected locations within the duct. A hollow sensing tube extends axially through one manifold of the first and second pairs, and one tube of the third pair. Each sensing tube is provided with an opening at some point within the manifolds for respectively communicating total and static pressures to the outside of the duct through appropriate fittings on one end of each sensing tube.

BRIEF DESCRIPTION OF THE DRAWINGS

FIG. 2 is a perspective view, with portions broken away, of the apparatus of FIG. 1 mounted in a section of rectangular duct, as it would appear during use;

FIGS. 4, 5 and 6 are further elevational views in section on the lines 4—4, 5—5 and 6—6, respectively, of FIG. 1;

Figure 1:
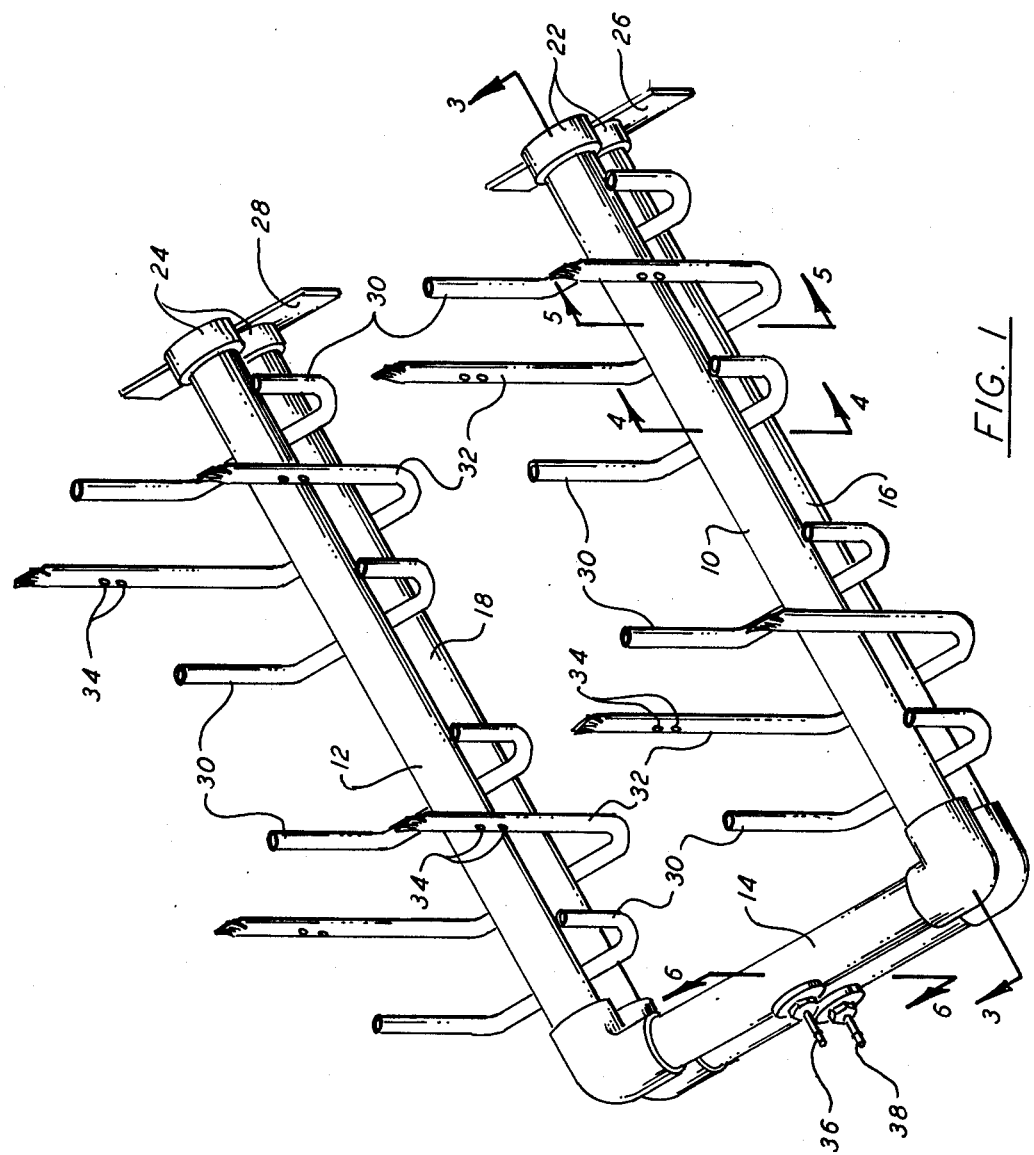
FIG. 1 is a perspective view of pressure sensing apparatus constructed according to the present invention.

Referring now to the drawings, in FIG. 1 is shown a first pair of hollow manifold tubes 10 and 12, substantially parallel to one another and joined at one end of each by suitable elbows, or the like, to connecting manifold tube 14. Closely adjacent and parallel to each of the first pair of tubes is a second pair of hollow manifold tubes 16 and 18, likewise joined at one end by connecting manifold 20. The ends of tubes 10 and 16 opposite the connections thereof to connecting manifolds 14 and 20, respectively, are closed by end caps 22. Similar end caps 24 close the corresponding ends of tubes 12 and 18. The end caps on tubes 16 and 18 are provided with fixed brackets 26 and 28 for mounting the apparatus within a duct, as will be later apparent.

Secured to each of tubes 10 and 12 are a plurality of U-shaped, hollow tubes or probes 30, of substantially smaller diameter than the manifold tubes to which they are connected. The ends of probes 30 are open at the terminus of each leg of the U, so that the probes may function as impact tubes in the intended application, as explained later herein, to sense total pressure in a fluid stream moving towards the open ends. A plurality of U-shaped, hollow probes 32 are connected to each of manifold tubes 16 and 18. Both ends of probes 32 are closed, one or more openings 34 being provided in the probe walls a short distance from the closed end of each leg, whereby probes 32 may sense static pressure of the fluid stream. Holes 34 must be free from burrs or other projections and perpendicular to air flow for optimum operation, in accordance with conventional practice. Fittings 36 and 38 are provided substantially at the center of connecting manifolds 14 and 20, respectively, the structure and function thereof being explained later in more detail.

Referring now to FIG. 2, the sensing apparatus generally described above is shown mounted for use in a square or rectangular wall section 40, having peripheral flanges 42 and 44 at each end. The sensing apparatus is supported by fixed attachment of brackets 26 and 28 to one side of wall section 40, and by fittings 36 and 38 passing through the opposite side thereof. Wall section 40 is intended for permanent installation at a selected location in a heating or ventilating duct or the same cross section to provide an indication of air velocity therethrough. Although air velocity may not be uniform across section 40, measurement of the average total and static pressures at a given plane will provide a reasonably close approximation of these pressures for purposes of determining the average velocity of air through the duct. For this purpose, lines 44 and 46 are connected at one end of fittings 36 and 38, respectively, to communicate the average total and static pressures from connecting manifolds 14 and 20 to opposite sides of a measuring instrument 48, such as an inclined manometer, which may be conveniently calibrated to read in cfm of air flow.

Wall section 40 is installed in the duct by attaching end flanges 50 and 52 to similar flanges provided for such purpose on the duct, a section thereof corresponding in length to wall section 40 being removed for installation of the sensing apparatus. Wall section 40 in effect becomes part of the duct, and installed so that air flow is in the direction of arrow 54. The upstream end of wall section 40 is filled with structure for removing turbulence from the air stream, a fragment of such structure indicated in FIG. 2 by reference numeral 56. Such practice is conventional in air flow measuring apparatus of the type of the present invention and may comprise, for example, an expanded aluminum structure of adjacent, hexagonal cells. The free open area of structure 56 is preferably in excess of 97% of the total area. Also, the velocity profile across the duct may be redeveloped by the linear drag coefficient introduced by the presence of structure 56. In any case, essentially parallel air flow at the static and total pressure sensing probes is provided.

Figure 3:
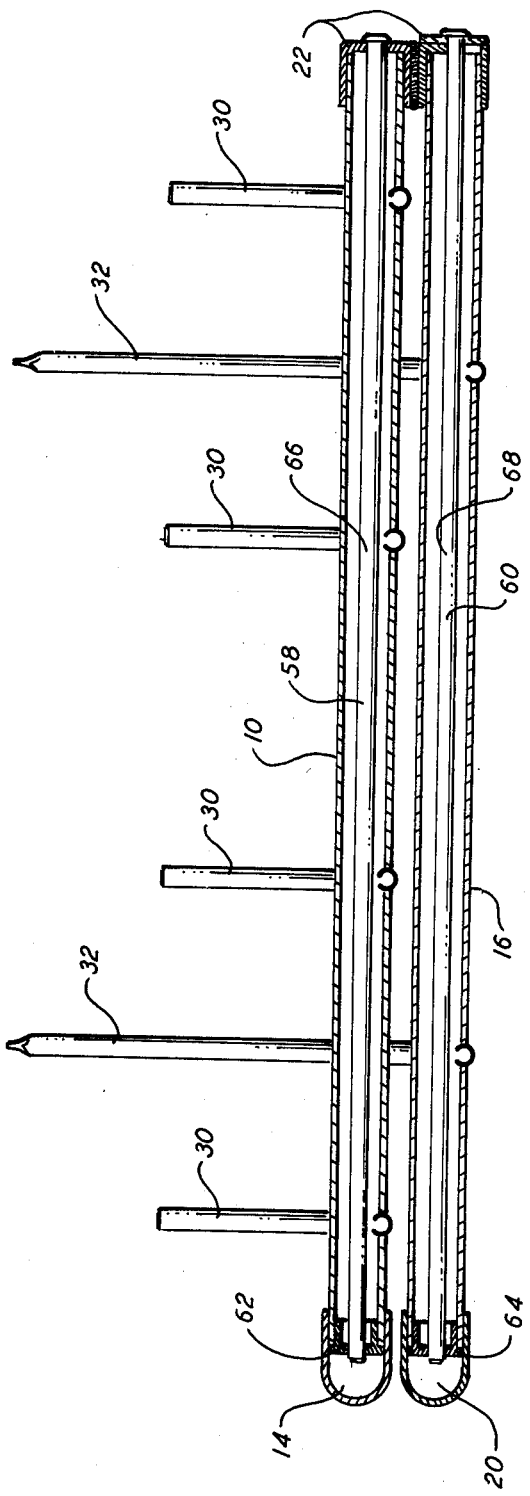
FIG. 3 is an elevational view in section on the line 3—3 of FIG. 1.

Referring now to FIG. 3, the internal structure of manifolds 10 and 16 is shown in detail, that of manifolds 12 and 18 being identical thereto. Hollow sensing tubes 58 and 60 are respectively positioned within manifold tubes 10 and 16, coaxially thereof. Each tubes 58 and 60 is closed at the end supported by end caps 22, and open at the opposite end. Tubes 58 and 60 extend through internal end plugs 62 and 64, respectively, to communicate through their open ends with the interiors of connecting manifolds 14 and 20. Sensing tube 58 is provided with an opening 66 in the form of a sawed slot, or hole, through the tube wall at some point within manifold tube 10. Opening 68 is likewise provided in sensing tube 60 to communicate the interior of manifold tube 16 with the interior of sensing tube 60.

Turning now to FIGS. 4 and 5, the structure and association of the total and static pressure sensing probes with the respective manifold and sensing tubes is shown in greater detail. Each of total pressure sensor probes 30 includes a pair of parallel legs 70 and 72, joined by a medial section 74 having an axis substantially perpendicular to that of the legs. An opening is provided in the wall of manifold tube 10 to accommodate a portion of section 74, a soldered or other airtight connection being provided about the periphery of the opening in the manifold tube. Such opening may conveniently be formed with a milling tool having a radius equal to the external radius of the tubes of which the probes are formed, to a depth approximately equal to the radius of the probes. Small opening 76 (FIG. 5) is provided at the mid-point of section 74, i.e., an equal distance from the end of each leg. Both ends at each of probes 30 communicate with the interior of manifolds 10 and 12 through openings 76.

Static sensor probes 32 also are formed with spaced, parallel legs 78 and 80, joined by perpendicular medial section 82, and are secured to manifold tube 16 about the entire periphery of an opening therein shaped to conform to the exterior of probes 32. Small opening 84 (FIG. 4) at the midpoint of section 82 provides communication of the interior of tubes 32 with the interior of manifold tube 16. As previously mentioned, the free ends of tubes 32, at the terminus of each leg, are closed, openings 34 being provided in opposite sides of both legs. The free ends of legs 70 and 72 are open and directed toward the upstream side of the unit, and terminate in a plane at or downstream of the plane of openings 34.

Figure 6:
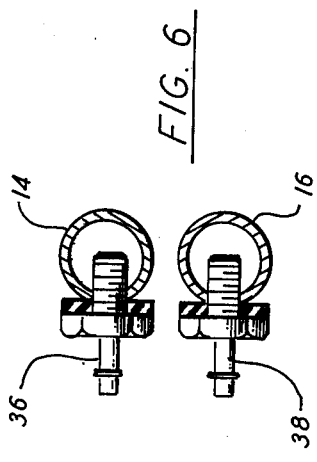

FIG. 6 illustrates in more detail the structure of fittings 36 and 38, through which the pressure in connecting manifolds 14 and 16 is communicated externally of the duct.

Thus, two sensing locations within the duct are provided by each of the U-shaped probes. No drilled openings are required in the manifold tubes, a single, milled opening being provided for connection of each double-ended sensor probe. The opening in the probe wall through which communication to the interior of the manifold is provided is small in relation to the milled opening in the manifold and is isolated from the periphery thereof, thus minimizing the likelihood of clogging the probe opening during connection of the probe to the manifold.

Figure 7:
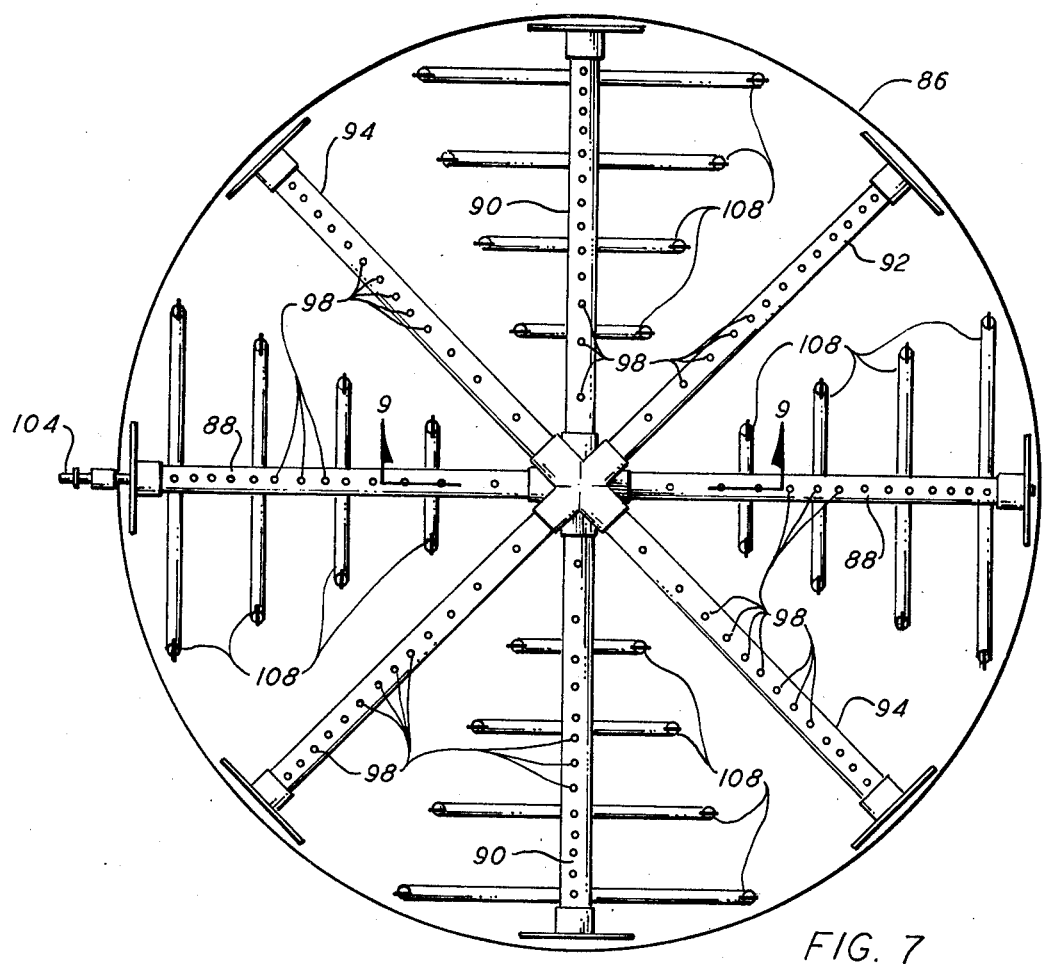
FIG. 7 is a plan view of a somewhat modified form of the sensing apparatus for mounting in a section of circular duct.
Figure 8:
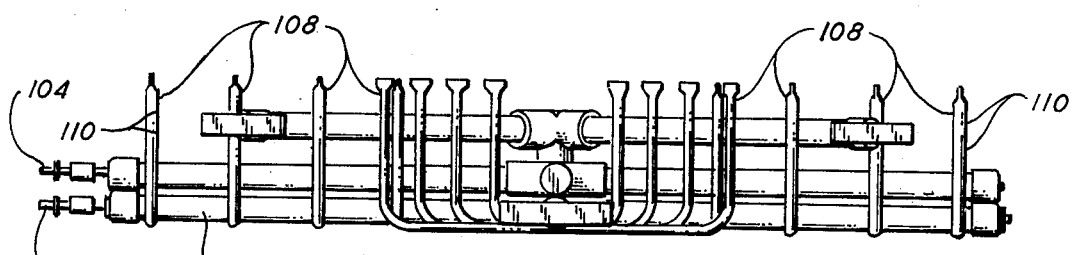
FIG. 8 is a side elevation of the apparatus of FIG. 7.
Figure 9:
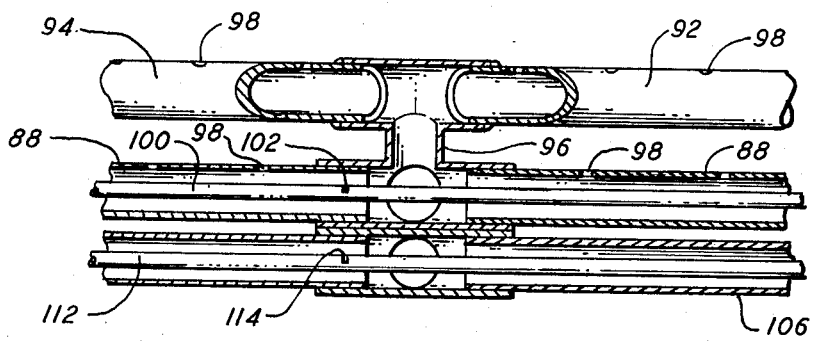
FIG. 9 is a fragmentary, elevational view of a portion of the apparatus of FIGS. 7 and 8, in section on the line 9—9 of FIG. 7.

FIGS. 7–9 show an embodiment of the invention constructed for incorporation in a circular section of air duct. Wall section 6 is of the same cross section as the duct (not shown) and is installed therein in the same manner as the previously described rectangular section. In this embodiment, the U-shaped probes are used only in connection with static pressure sensing. A first pair of total pressure sensor manifolds 88 and 90 extend diametrically across the wall section, perpendicular to one another, crossing and communicating at the center. A second pair of manifolds 92 and 94 are also arranged perpendicular to one another and laterally adjacent the first pair, rotated 45° with respect thereto. The second pair of manifolds also cross and communicate with one another at the center, and the two pairs communicate with one another through central, connecting manifold 96, as seen in FIG. 9.

Each of manifold tubes 88, 90, 92 and 94 is provided with a plurality of openings 98 along its length. Wall section 86 is installed in the duct with openings 98 facing in the upstream direction of air flow, whereby the total pressure within the duct at each manifold opening is communicated therethrough to the interior of the manifolds. Sensing tube 100, having opening 102 therein, is positioned within manifold 88 (or any of the other total pressure measuring manifolds). The internal volume of manifold tubes 88, 90, 92 and 94, and connecting manifold 96 forms a common chamber the pressure within which represents a reasonably close approximation of the average total pressure within the duct at the location of the manifolds. This pressure is communicated through opening 102 to the interior of sensing tube 100, and thence through fitting 104 to an appropriate measuring instrument (not shown) in the same manner as in the previously described embodiment.

A third pair of hollow manifold tubes extend across wall section 86, perpendicular to one another and communicating at the center, where the tubes cross. One of these tubes 106 is seen in FIGS. 8 and 9, the other being hidden in FIG. 7 by tube 90. A plurality of U-shaped static sensor probes 108 are attached to each of the manifold tubes of the third pair and communicate with the interior thereof in the same manner as probes 32 are associated with manifolds 16 and 18 in the previously described embodiment. The ends of probes 108 are closed, the static pressure within the duct being communicated through openings 110 in the sides of probes 108, to the interior of the plenum formed by the combined interior volume of manifold tubes 106, and the associated static pressure manifold.

Hollow sensing tube 112 is mounted coaxially within manifold tube 106, and includes opening 114 through which the pressure within the manifold is communicated to the sensing tube. Fitting 116 (FIG. 8) extends through wall section 86 to communicate the pressure from sensing tube 112 to the measuring instrument. Although not shown, an air straighten section is provided in the circular unit upstream of the sensing probes, as in the rectangular unit. Both the total pressure sensing points (represented by the openings in manifold tubes 88, 90, 92 and 94) and the static pressure sensing points (the ends of probes 108) are located substantially at the centers of segments of equal area of transverse planes of the duct section.

An object of the sensor construction is to create an equalized total pressure any place within the manifold. For purpose of this description the equalized total pressure is defined as that pressure equal to the total pressure in the duct if a uniform velocity profile existed across the duct's cross-sectional area.

This object is accomplished by proportioning the area of openings 76 as small as practicable with respect to the cross-sectional area of the manifold and its length so as to limit the flow of air into or out of the manifold tube 10 thus allowing the manifold tube to function as a plenum in which the conditions approach those to which Pascal's law applies. Since non-uniform velocity profiles are commonly encountered in air conditioning and ventilation systems there will be a flow of air through openings 76 and in tube 10 between openings 76. It is recognized that openings 76 cannot be so small as to allow plugging to occur due to contaminants in the flow of air. For general applications the openings 76 must be of uniform size to avoid variations in the flow through the openings due to size differences rather than to pressure differences. In special cases where a fixed and known velocity profile must be accurately accommodated, the size of these openings may be intentionally varied.

The probe design of this invention enhances the pressure equalizing ability of the device in at least two ways:

1. The communicating opening is located at the center of the probe exactly midway between the probe's open ends. It is at this point that the exact average of the pressures sensed at the two open ends of the probe exists.

2. Only one communicating opening 76 is required for each pair of sensing locations, further limiting the amount of air flow into or out of the manifold.

By sizing the manifold 10 sufficiently large with respect to opening 76 and the manifold length so as to maintain structural integrity and to reduce the velocity of the air flow in the manifold, any appreciable pressure drop along the tube is eliminated. The sizing is limited by considerations of cost and the desirability of limiting the obstruction to air flow in the duct in which the device is installed.

It has been found that this object can be accomplished by providing openings 76 which are 0.007 square inches in area for communication with a manifold tube which has an effective interior area of at least 0.0056 square inches per inch of manifold length. Larger openings 76 would require a larger effective cross-sectional area per inch of manifold length. The effective internal area of the manifold 10 is that which is not occupied by sensing tube 58. Thus, the size of the sensing tube must also be considered in proportioning the probe and manifold components. In a unit having openings 0.007 square inches in area communicating the pressure of double-ended probes to the manifold and a sensing tube having an outside diameter of 0.25 inches, the following effective internal manifold areas have been found to be adequate to accomplish the necessary degree of pressure equalization: 0.20 square inches for lengths up to 36 inches; 0.47 square inches for lengths between 36 and 84 inches; 0.83 square inches for lengths between 84 and 148 inches.

What is claimed is:

1. Apparatus for measuring the pressure within an enclosed duct having fluid flowing in a first direction therethrough, said apparatus comprising, in combination:
   a. at least one hollow manifold tube extending laterally across the duct and having an effective internal cross sectional area, constant along its entire length, of a first predetermined value, and a length of a second predetermined value;
   b. a plurality of hollow, U-shaped sensing tubes arranged at spaced intervals along the length of said manifold tube, each of said sensing tubes having open ends directed oppositely to the direction of fluid flow;
   c. each of said sensing tubes having an opening located substantially at the mid-point between said open ends and having an area of a third predetermined value;
   d. means fixedly connecting and effecting an air-tight seal between each of said sensing tubes, substantially at the mid-points thereof, and said manifold tube for communication of the interiors thereof through said sensing tube openings;
   e. the ratio of said first and second values being sufficiently large with respect to said third value, to reduce the velocity of air flow within said manifold to an extent eliminating any appreciable pressure drop along the length of said manifold tube; and
   f. means for communicating the pressure within said manifold tube to a point outside the duct.

2. The invention according to claim 1 wherein said third predetermined value is approximately 0.007 square inches.

3. The invention according to claim 2 wherein said ratio of said first to said second predetermined value is at least 0.0056 square inches per inch of length of said manifold tube.

4. The invention according to claim 1 including two of said manifold tubes extending in spaced, parallel relation, laterally across said duct in substantially the same transverse plane thereof, a plurality of said sensing tubes connected to each of said manifold tubes, a hollow connecting manifold tube arranged within and closely adjacent a wall of said duct, each of said two manifold tubes being connected at one end of each to said connecting manifold, and means for communicating the pressure within said manifold tubes to said connecting manifold.

5. The invention according to claim 4 wherein said means for communicating the pressure to a point outside said duct comprises a single fitting extending from said connecting manifold through the adjacent duct wall.

6. Apparatus for measuring the pressure within an enclosed duct having fluid flowing in a first direction therethrough, said apparatus comprising, in combination:
 a. first and second hollow manifold tubes extending transversely across the interior of the duct;
 b. a plurality of total pressure sensing probes connected to and communicating with said first manifold tube and extending therefrom to open terminal ends arranged substantially at the centers of equal area segments of a first transverse plane of the duct in the upstream direction from both of said manifold tubes;
 c. a plurality of static pressure sensing probes connected to and communicating with said second manifold tube and extending therefrom to static pressure communicating openings arranged substantially at the centers of equal area segments of a second transverse plane at least as far in the upstream direction from said manifold tubes as said first transverse plane; and
 d. means for communicating the pressure within both of said manifold tubes to points outside of the duct.

7. The invention according to claim 6 wherein said static pressure sensing probes comprise hollow tubes extending in the upstream direction from said second manifold tube to closed ends adjacent which said static pressure communicating openings are located.

* * * * *